July 12, 1966
N. R. HARLOW
3,260,774
METHOD FOR THE CONTINUOUS EXTRUSION OF UNSINTERED
POLYTETRAFLUOROETHYLENE POWDER
Filed Jan. 21, 1963
2 Sheets-Sheet 2
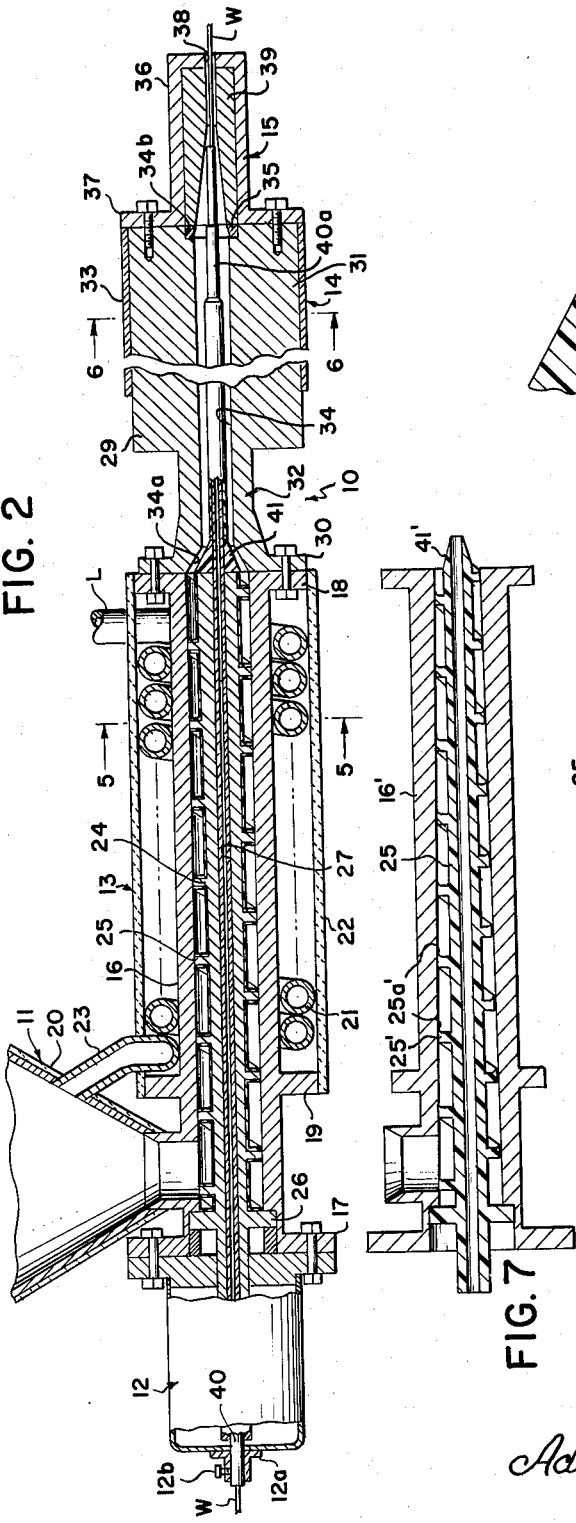
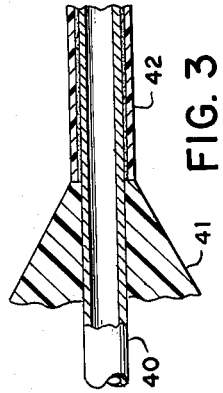
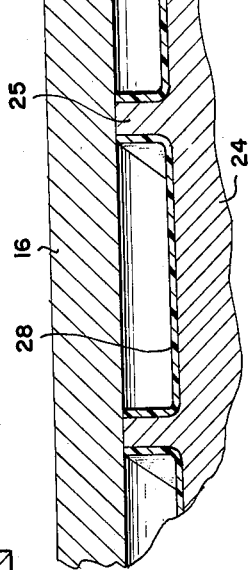
INVENTOR.
NORMAN RALPH HARLOW
BY
Adams, Forward and McLean
ATTORNEYS 3,260,774
METHOD FOR THE CONTINUOUS EXTRUSION OF UNSINTERED POLYTETRAFLUOROETHYLENE POWDER
Norman R. Harlow, Central Valley, N.Y., assignor to Tensolite Insulated Wire Co., Inc., Tarrytown, N.Y., a corporation of Delaware
Filed Jan. 21, 1963, Ser. No. 252,874
4 Claims. (Cl. 264—28)

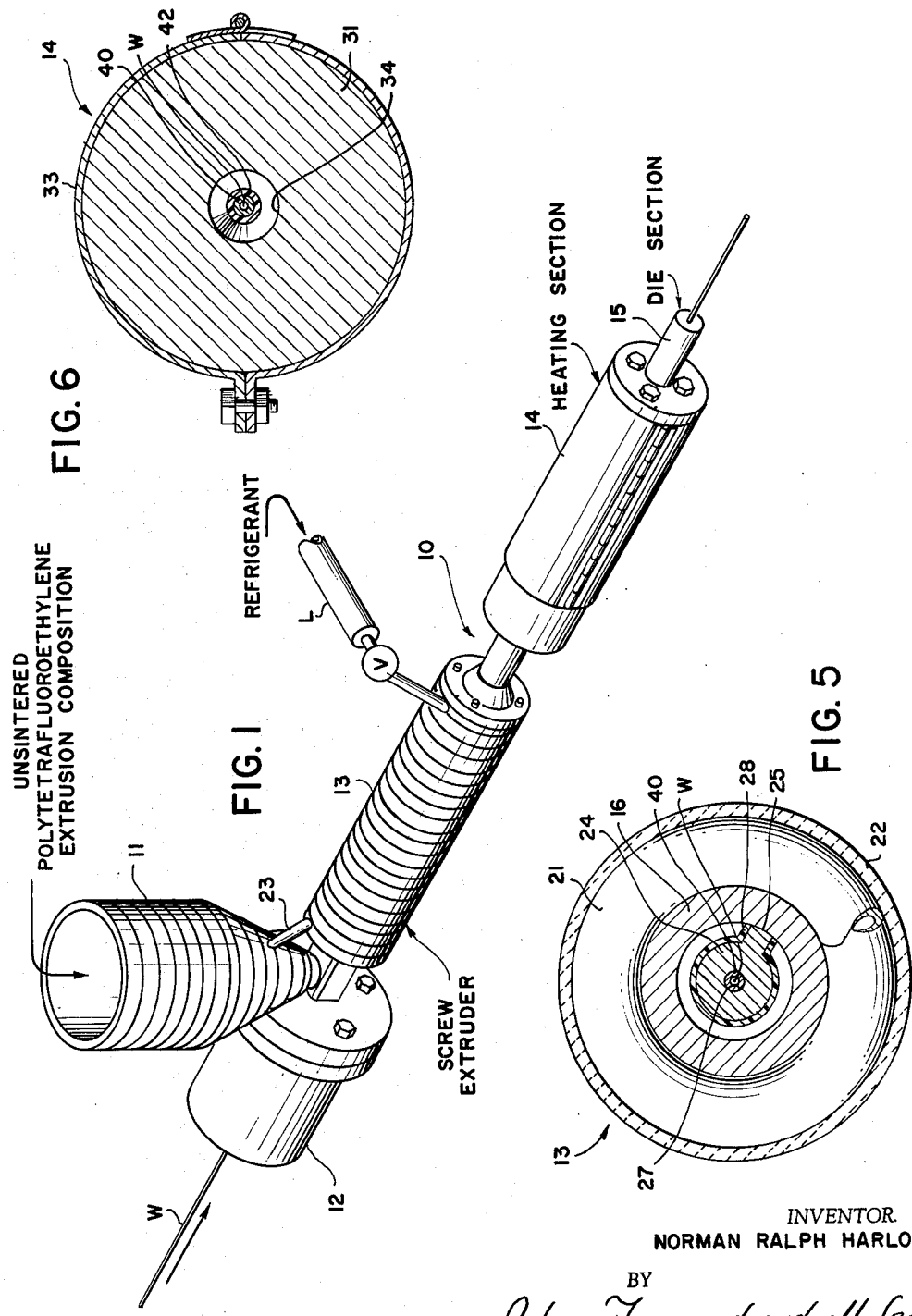

My invention relates to the processing of polytetrafluoroethylene and has for its principal object the provision of a method to enable the continuous extrusion of unsintered polytetrafluoroethylene powder.

Polytetrafluoroethylene suitable for extrusion is commercially available in two forms. The first form is a pulverized, sintered polytetrafluoroethylene which can be extruded with a conventional screw extruder utilizing high extrusion pressure through a die heated to a temperature on the order of 700° F. Since the extrudate, as it passes through the die, must reach sintering temperature of about 621° F. in order to coalesce, and since relatively high internal pressures are developed, such extrusion is slow and is limited in its range of usefulness. The second form of polytetrafluoroethylene suitable for extrusion is a fine powder which has not been sintered. The latter material is distinguished from the former in that it is relatively soft, somewhat coherent and can be extruded at room temperature usually with an extrusion aid to form a coherent extrudate, while the former is a hard, granular material, non-coherent at room temperatures and which must be fused by sintering in order to produce a coherent product.

Because of the relative ease with which unsintered polytetrafluoroethylene extrusion powder can be extruded it has found wide application, particularly for thin tapes, wire insulation and the like.

The latter mentioned unsintered extrusion powder, however, cannot consistently be continuously extruded by presently available techniques, and it is the elimination of this disadvantage to which my present invention is directed.

Unsintered polytetrafluoroethylene extrusion powder, known in the industry as T-6, is composed of fine particles having diameters on the order of one-half micron which when compressed link together, and when lengthened or pushed out of shape the linked particles form fibers. As is well known, with proper lubrication these fibers will slide past each other and link when being extruded with substantial reduction in transverse section.

Unsintered polytetrafluoroethylene powder is not readily amenable to screw extrusion, however, in that, as the particles travel down the flights of the screw they are continually sheared, broken up and mixed such that the fibers no longer link together and lack orientation with the result that the extrudate is mechanically weak and has poor dielectric properties. For this reason the industry has generally found it necessary to employ ram type extrusion for T-6 and similar unsintered polytetrafluoroethylene powders; indeed, in the extruding of thin wall wire insulation or tubing (for which the sintered molding powder is not suitable) ram extrusion of the unsintered polytetrafluoroethylene powder has been the only technique generally available heretofore.

This technique (ram extrusion) suffers the disadvantage that the operation is not continuous, since the ram must be opened up and recharged at the end of each stroke, and thus has the concomitant disadvantage that the operation is slow and laborious. In addition in ram extrusion of thin wall tubing and wire insulation it has been found necessary in obtaining desirable mechanical and electrical properties that the charge for the ram be pre-formed by pre-compacting into cylinder form, thus further complicating the operation. Finally, it will be realized that by reason of the discontinuous nature of ram extrusion, particularly in the case of wire insulation, indefinite lengths of product are not possible, such that relatively short lengths of product must each be separately tested, where if indefinite lengths were available many repetitious tests could be eliminated.

It is thus another object of my invention to eliminate these disadvantages arising because of the discontinuous manner in which extrusion of unsintered polytetrafluoroethylene has heretofore been carried out.

In accordance with my invention I utilize the known property of unsintered polytetrafluoroethylene powders typified by T-6 powder that as the temperature of the powder is reduced below 65° F. the ability of the individual particles to link together and to form fibers is lessened. Thus, in accordance with my invention, I contemplate precooling unsintered polytetrafluoroethylene extrusion powder, suitably mixed by lubricant, etc., to a temperature generally below about −40° F. and preferably to a temperature on the order of −100° F. at which temperatures the particles are non-coherent and granular.

In this condition I then continuously introduce the particles into a screw extruder which is also at a reduced temperature below −40° F. and preferably at −100° F. to maintain the extrusion powder at such temperature. The powder is advanced through the barrel of the extruder by the flights on the screw which are preferably sized to provide a decreasing open cross-sectional area through the extruder towards its outlet. As the powder is advanced through the barrel of the extruder by the screw, it is compacted under increasing mechanical pressure while at a reduced temperature below −40° F. such that the powder is formed into a densely compacted, relatively non-coherent mass of granular particles which is then forced into a heating chamber interposed between the extruder screw and the extruder die.

The heating chamber typically is a tube mounted at one end on the outlet of the extruder, carries the die at its end remote from the extruder, and is provided with a heating band or other arrangements to raise the temperature of the compacted mass of polytetrafluoroethylene particles being forced through the heating chamber to a temperature conventionally employed in extruding unsintered polytetrafluoroethylene powder at least above 73° F. and preferably between 73–100° F. The compacted mass is thence passed through the extruder die which is sized in a conventional manner to reduce the transverse section of the extrudate and thus elongate the particles into fibers which link in a conventional manner.

It will be noted that in accordance with my invention lubricants normally employed as extrusion aids, pigments, fillers and the like can still be employed, taking due consideration of their compatibility with the low temperatures required in compacting the polytetrafluoroethylene powders prior to extrusion. It will also be noted that frequently in ram extrusion techniques substantial area reductions are utilized during extrusion, i.e., on the order to 1500:1, in order to obtain maximum length to extruded product on a given stroke of the extruder. Such high area reductions require relatively large quantities of extrusion aid and have led to the development of special extrusion powders which will accommodate such area reduction but which frequently do not form as good a product either mechanically or electrically. Since such high area reductions are not required when utilizing my invention in which area reductions on the order of 100:1 are not only feasible but preferable, yet another advantage to be found in my invention is the reduction in the required quantity of extrusion aid and the permissive use of extrusion powders yielding better physical properties in the extruded product.

In practicing my invention it will be observed that extruders normally employed to extrude thermoplastics and rubber are designed not only to generate pressure to effect extrusion but also to mix and to heat the product to be extruded. Quite unlike thermoplastic and rubber materials, unsintered polytetrafluoroethylene requires only pressure for extrusion, and mixing, even at reduced temperature, is undesirable. Thus the extruder should preferably be modified to minimize mixing of the polytetrafluoroethylene particles as they travel along the screw.

To this end I provide an extruder in which the screw itself is provided between flights with a surface of slippery material, such as sintered polytetrafluoroethylene, across which the unsintered polytetrafluoroethylene particles being advanced along the screw slide readily such that the particles travel through the extruder with minimum helical motion. Indeed it is desirable, in order to prevent particles being trapped in the clearances between the barrel of the extruder and screw flights, that the advancing edges of the screw flights be in sealing contact with the inner wall of the extruder barrel preferably by forming such advancing edges with a lip of a resilient material, such as sintered polytetrafluoroethylene.

For a more complete understanding of the practical application of my invention reference is made to the appended drawings in which:

FIGURE 1 is an isometric view of an extruder for continuous extrusion of unsintered polytetrafluoroethylene powder in accordance with my invention;

FIGURE 2 is a longitudinal vertical section of the extruder shown in FIGURE 1;

FIGURE 3 is a fragmentary enlarged view of the portion of the extruder shown in FIGURE 1;

FIGURE 4 is an enlarged fragmentary view of another portion of the extruder shown in FIGURE 1;

FIGURE 5 is a cross-section taken at line 5—5 in FIGURE 2;

FIGURE 6 is a cross-section taken at line 6—6 in FIGURE 2; and

FIGURE 7 is a fragmentary longitudinal vertical section of a modification of the extruder shown in FIGURES 1 and 2.

Referring more particularly to FIGURES 1 and 2 an extruder suitable for continuous extrusion of unsintered polytetrafluoroethylene powder in accordance with my invention is designated by the reference numeral 10. Extruder 10 basically is composed of a hopper 11, a motor 12, a screw section 13, a heating section 14 and a die section 15.

Screw section 13 includes a cylindrical, horizontally mounted metal barrel 16 provided with annular end flanges 17 and 18 at its opposite ends and with an annular flange 19 closely adjacent flange 17. Barrel 16, intermediate flanges 17 and 19, is provided in its upper portion with an aperture receiving the open apex of the conical bottom of hopper 11, the upper end of which is generally cylindrical and open at its top. Hopper 11 preferably is provided with an exterior layer 20 of adhesive, thermal insulating material.

Barrel 16 is further provided with a tight, helical winding 21 of copper tubing extending between flanges 18 and 19. Winding 21 like hopper 11 is covered by an exterior layer of adhesive, thermal insulating material designated by the reference numeral 22, and the end of winding 21 adjacent flange 19 extends upwardly and terminates in an aperture in the conical wall of hopper 11, in which end 23 is brazed to secure it to hopper 11.

The interior of barrel 16 receives an auger, i.e., a screw 24, having a flight 25 with uniform pitch extending the length of barrel 16 from beneath hopper 11 to the end of barrel 16 carrying flange 18. The peripheral edge of flight 25, as will be noted referring more particularly to FIGURES 4 and 5 is in sliding, sealing contact with the interior cylindrical wall of barrel 16, and the open space between any two successive convolutions of flight 25 about screw 24 has a generally rectangular longitudinal section. As will be seen referring more particularly to FIGURE 2, however, the root diameter of screw 24 increases along the screw from a relatively smaller diameter beneath hopper 11 to a relatively larger diameter at the end of screw 24 adjacent flange 18, such that the volume of the open space between adjacent convolutions of flight 25 is decreased from hopper 11 to flange 18, by a ratio of 2:1 in the illustrated extruder.

The end of screw 24 adjacent flange 17 extends outwardly from barrel 16 and immediately interiorly of barrel 16 is flanged, as indicated by the reference numeral 26, to seat in a counterbore in barrel 16 at that end of barrel 16 and thus serves to close the interior of barrel 16 at flanged end 17. It will be noted that flight 25 terminates at flange 26 and that motor 12 receives the end of screw 24 extending from barrel 16 at flanged end 17 to which the casing of motor 12 is bolted. In the manner conventional to extruders for extruding thermoplastic insulation on wire, a bushing 12a is provided in the casing of motor 12 to admit wire W through the center of motor 12 into an axial bore 27 through screw 24.

Insofar as extruder 10 has been described to this point, its construction is entirely conventional except that thermally insulated helical winding 21 replaces the conventional heating jacket and hopper 11 is provided with an outer skin 20 of thermal insulating material.

In accordance with my invention, however, screw 24 is preferably modified by providing all the surface of the screw which will contact material being fed through the extruder with a slipper surface in order to minimize helical drag on such material and to maximize the longitudinal drag afforded by the metal inner wall of barrel 16. Such a slippery finish is provided in the illustrated extruder by bonding a layer of sintered polytetrafluoroethylene tape, e.g. skived tape, 28 along the length of the root of screw 24 with the edges of tape 28 riding up on the sides of flight 25, as seen best in FIGURES 4 and 5.

In addition flange 18 which would conventionally carry die section 15 carries instead heating section 14 which includes a cylindrical metal block 29 which at one end is sucked down as indicated at 32 and is provided with an annular flange 30 bolted to flange 18 on barrel 16. The remaining length 31 of block 29 remote from flange 30 is enclosed by an electrical heating band 33.

Interiorly block 29 has a longitudinal bore 34, defining a heating chamber, which communicates with the interior of barrel 16 at its end adjacent barrel 16 and which at such end has the same diameter as and registers with the inside of barrel 16. Bore 34, however, immediately tapers at 34a to a narrower diameter which is maintained throughout the length of bore 34 to its end remote from barrel 16, except that bore 34 is counterbored, as indicated by the reference numeral 34b, at the end of block 29 remote from flange 30 to receive a die ring 35 which tapers the diameter of bore 34 to a slightly smaller diameter at such end of tube 29.

Die section 15 includes a cup 36 which at one end is provided with an annular flange 37 which is bolted to flange 31 on tube 29. The other end of cup 36 is closed except for a central aperture 38, and cup 36 receives a die 39 in its interior which is held by cup 36 firmly against ring 35. Die 39 is provided with an axial elongated opening having a diameter at its end butting ring 35 equal to that of ring 35 at that point. Thereafter the inside of die 39 tapers inwardly toward its and adjacent aperture 38 to a diameter equal to that of aperture 38 (the size of the outside diameter of the insulating covering to be applied to wire W) and extends with such diameter up to aperture 38 which registers with such interior opening in die 39.

It will be noted that a long steel tube of a uniform diameter through most of its length slightly less than the inside diameter of bore 27 in screw 24 extends through bushing 12a to enclose wire W throughout the length of screw 24, through block 29 and into die 39 up to a point just short of the end of the taper of the opening through die 39. Tube 40 functions in the same manner as tubing commonly employed with ram type extruders, and is anchored by a set screw 12b in bushing 12a against rotation in extruder 10.

Referring to FIGURE 3, a hollow, conical, sintered polytetrafluoroethylene seal 41 is affixed to the end of screw 24 at the end of barrel 16 carrying flange 18 such that seal 41 lies immediately within tapered section 34a of bore 34 in block 29. Seal 41 sliding receives tube 40. Referring also to FIGURE 6 the portion of tube 40 extending outwardly of screw 24 beyond seal 41 is provided with a layer 42 of sintered polytetrafluoroethylene which extends substantially down the length of block 29 terminating in portion 31 of block 29 just short of die ring 35. Tube 40, as indicated by the reference numeral 40a, is tapered at such point to a slightly smaller diameter which extends through the remainder of the length of tube 40 in block 29 toward die section 15 provided with a short taper beneath ring 35 to a yet smaller diameter which extends along the rest of the length of tube 40 into die 39. The tapers in tube 40 and their relationship with respect to block 29, collar 35 and die 39 are conventional in ram extruders for unsintered polytetrafluoroethylene powder, and are based on well known considerations concerning proper fiber orientation and the like.

In operation with extruder 10 set up having a wire W passing from a pay-off reel over suitable sheaves to permit it to be passed through bushing 12a, down through the center of tube 40 and out through aperture 38 to a suitable capstan and sheave for drawing wire W and for maintaining its axial position relative to extruder 10 as it passes through extruder 10 and to permit wire W to be coiled on a take-up reel. Hopper 11 is then charged with a suitable unsintered polytetrafluoroethylene extrusion powder for example a mixture of unsintered polytetrafluoroethylene T–6 extrusion powder and 16% by weight kerosene.

Hopper 11, its contents of polytetrafluoroethylene extrusion composition and screw section 13 of extruder 10 are then brought down to approximately −100° F. by discharging liquid nitrogen into winding 21 through valved line L connected to the end of winding 21 remote from hopper 11. The flashing of the nitrogen in winding 21 results in rapid reduction in temperature in screw section 13, and the discharge of cold gas into hopper 11 similarly cools the material in hopper 11. The discharge of liquid nitrogen into winding 21 is continued until a −100° F. temperature in the extrusion composition and extruder barrel and hopper is readied.

Motor 12 is then started to rotate screw 24 in a direction advancing flight 25 to the right, as seen in FIGURE 2, to draw cold extrusion composition continuously from hopper 11 into barrel 16, to advance it along barrel 16 while compacting it and thence to pass the compacted cold material from barrel 16 into the annular space in tube 29 about tube 40. Heating mantle 33 is adjusted relative to the rate of feed of extrusion composition through tube 29 such that the material leaves tube 29 and passes into die section 15 at a temperature of approximately 90° F.

The material passing into die section 15 is reduced in cross section and increased in speed such that it exists relatively rapidly out through aperture 38 about wire W the speed of which is adjusted to equal the speed of extrudate leaving aperture 38. Normally a reduction in cross sectional area of the extrudate passing through die section 15 of about 100:1 is preferred. This reduction accompanied by the slight dwell provided in tube 29 about reduced tube section 40a provides the desired orientation of fibers such that the extruded covering on wire W issuing from aperture 38 possesses the tough longitudinal cohesiveness characteristic of ram extruded unsintered polytetrafluoroethylene.

It will be understood that the insulated wire withdrawn from extruder 10 rather than being passed to a take-off spool can be directed through a baking oven to eliminate the kerosene lubricant and thence to a sintering oven to cure the polytetrafluoroethylene in a manner identical with that employed with ram extruded polytetrafluoroethylene with the exception that no periodic shut-down is required to recharge the extruder, as the apparatus may be continually operated by recharging hopper 10 as the supply of extrusion material gets low and by repeatedly discharging liquid nitrogen into winding 21 to maintain the required reduced temperature.

While the above described apparatus has produced satisfactory results, its operation indicates that a further departure in design from a conventional thermoplastic extruder is desirable. This departure is illustrated more fully with reference to FIGURE 7 which shows a barrel 16' and screw 24' which can be substituted for barrel 16 and screw 24 of extruder 10. In this arrangement screw 24' including an integral tip 41' coersponding to barrel 41 is cast entirely of sintered polytetrafluoroethylene, in order that the surfaces of screw 24' in contact with material being extruded be slippery.

Purely as a discretionary matter in order to provide the reduction in volume of material between successive convolutions of flight 25 from inlet to outlet, rather than by increasing root diameter in this modification the outside diameter of the screw is decreased and the root diameter remains uniform.

More important, however, is the modification in configuration of flight 25. In this arrangement the periphery of the flight in contact with the inner wall of barrel 16' (which is tapered to correspond with the decrease in outside diameter of the screw) is curved forward on the leading side, as indicated by the reference numeral 25a'. Thus the pressure of material being compacted by screw 24' in barrel 16' will cause the resilient "lip" designated by the reference numeral 25a' to be pressed tightly against the inner wall of barrel 16' and thus prevent any back flow of material past the flight. This construction is highly desirable since material working its way between the edge of the flight and the inner wall of the barrel is worked substantially greater than material normally being advanced through the barrel and can be elongated into fiber form prematurely.

I claim.

1. A method for extruding unsintered polytetrafluoroethylene which includes reducing the temperature of an unsintered polytetrafluoroethylene powdered extrusion composition to a reduced temperature at which the particles of unsintered polytetrafluoroethylene lack coherence and are granular, continuously advancing such composition through a confined zone while maintaining such composition at a said reduced temperature, compacting said composition under increasing mechanical pressure as the composition is advanced through said confined zone to form a densely compacted mass, thereafter passing said compacted mass through a confined heating zone under the mechanical pressure developed in said first confined zone and heating said composition to a temperature at which the polytetrafluoroethylene particles in said composition are coherent and when lengthened form fibers, and thereafter extruding the heated composition from said second confined zone under the mechanical pressure developed in said first confined zone.

2. A method according to claim 1 in which the temperature at which the extruded composition is reduced is below −40° F. and the temperature at which said composition is heated in said confined heating zone is above 73° F.

3. A method for extruding unsintered polytetrafluoroethylene which includes reducing the temperature of an unsintered polytetrafluoroethylene powdered extrusion composition to a reduced temperature less than about −40° F., continuously advancing such composition through a confined zone while maintaining such composition at a said reduced temperature, compacting said composition under increasing mechanical pressure as the composition is advanced through said confined zone to form a densely compacted mass, thereafter passing said compacted mass through a confined heating zone under the mechanical pressure developed in said first confined zone and heating said composition to a temperature above about 73° F., and thereafter extruding the heated composition from said second confined zone under the mechanical pressure developed in said first confined zone.

4. A method according to claim 1 wherein said unsintered polytetrafluoroethylene powdered extrusion composition consists essentially of a mixture of unsintered polytetrafluoroethylene extrusion powder and a lubricant.

References Cited by the Examiner

UNITED STATES PATENTS

| 3,066,356 | 12/1962 | Porter. |
| 3,068,515 | 12/1962 | Thomas. |
| 3,069,727 | 12/1962 | Schramek. |
| 3,079,634 | 3/1963 | Berger. |

ROBERT F. WHITE, *Primary Examiner.*

MORRIS LIEBMAN, *Examiner.*

M. H. ROSEN, A. R. NOE, *Assistant Examiners.*